US012583507B1

(12) United States Patent
Bechtel et al.

(10) Patent No.:  US 12,583,507 B1
(45) Date of Patent:       Mar. 24, 2026

(54) DECOUPLED DRIVER CONTROLS MODULE FOR VEHICLE

(71) Applicant: FCA US LLC, Auburn Hills, MI (US)

(72) Inventors: Travis D Bechtel, Auburn Hills, MI (US); Zachary A Luetzen, Auburn Hills, MI (US); Brandon F Brady, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/954,649

(22) Filed: Nov. 21, 2024

(51) Int. Cl.
*B62D 5/00*         (2006.01)
*B60K 26/02*       (2006.01)
                  (Continued)

(52) U.S. Cl.
CPC .............. *B62D 5/006* (2013.01); *B60K 26/02* (2013.01); *B60K 35/10* (2024.01);
                  (Continued)

(58) Field of Classification Search
CPC .......... B62D 5/00; B62D 5/001; B62D 5/005; B62D 5/006; B62D 65/04; B62D 65/14; B60K 26/02; B60K 26/021; B60K 2026/022; B60K 2026/023; B60K 2026/024; B60K 35/10; B60K 35/50; B60K 35/53; B60K 2360/685; B60K 2360/828; B60K 2360/834; B60R 16/0215; B60R 16/0207; B60R 16/03; B60T 7/06; B60T 2260/02; B60T 2270/82; G05G 1/36; G05G 1/38
                  (Continued)

(56) References Cited

U.S. PATENT DOCUMENTS 4,126,202 A * 11/1978 Hern ................... B62D 49/0692
                                                       180/90
4,582,156 A * 4/1986 Kochy ................. B62D 25/081
                                                       296/72
                  (Continued)

FOREIGN PATENT DOCUMENTS

CN          221068200 U  *  6/2024
CN          118810891 A  *  10/2024
                  (Continued)

*Primary Examiner* — Keith J Frisby
(74) *Attorney, Agent, or Firm* — Jeremy J. Klobucar

(57)                    ABSTRACT

A decoupled driver controls module is configured to be selectively attached to and repositionable within a vehicle, and includes a pedal/steering integration structure configured to removably couple to the vehicle, a steer-by-wire steering column, and a steering column feedback actuator configured to provide one or more signals indicative of a steering angle of the steering column. A brake-by-wire brake pedal is pivotally coupled to the pedal/steering integration structure, and a brake pedal feedback actuator is operably associated with the brake pedal. A throttle-by-wire accelerator pedal is pivotally coupled to the pedal/steering integration structure, and a throttle position sensor is operably associated with the accelerator pedal. The decoupled driver controls module is configured as a single unit that can be installed into and selectively removed from the vehicle to facilitate repair/service or repositioning of the decoupled driver controls module within the vehicle.

17 Claims, 3 Drawing Sheets

(51) Int. Cl.

| | |
|---|---|
| *B60K 35/10* | (2024.01) |
| *B60R 16/02* | (2006.01) |
| *B60R 16/03* | (2006.01) |
| *B60T 7/06* | (2006.01) |
| *B62D 65/04* | (2006.01) |
| *B62D 65/14* | (2006.01) |
| *G05G 1/36* | (2008.04) |
| *G05G 1/38* | (2008.04) |

(52) U.S. Cl.
CPC .......... *B60R 16/0215* (2013.01); *B60R 16/03* (2013.01); *B60T 7/06* (2013.01); *B62D 65/04* (2013.01); *B62D 65/14* (2013.01); *G05G 1/36* (2013.01); *G05G 1/38* (2013.01); *B60K 2026/024* (2013.01); *B60K 2360/828* (2024.01); *B60T 2260/02* (2013.01); *B60T 2270/82* (2013.01)

(58) Field of Classification Search
USPC ........................................... 180/326
See application file for complete search history.

(56) References Cited

U.S. PATENT DOCUMENTS

| | | | | |
|---|---|---|---|---|
| 6,073,987 A * | 6/2000 | Lindberg | ............ | B62D 25/142 |
| | | | | 296/70 |
| 6,419,270 B1 * | 7/2002 | Boyle, III | ............... | B62D 1/16 |
| | | | | 280/779 |
| 10,175,713 B1 * | 1/2019 | Howell | ..................... | B60T 7/06 |
| 12,252,041 B2 * | 3/2025 | Favaretto | ................. | B62D 1/18 |

| | | | | |
|---|---|---|---|---|
| 2002/0170761 A1 * | 11/2002 | Honekamp | ............... | B60T 7/02 |
| | | | | 180/90 |
| 2003/0051571 A1 * | 3/2003 | Staker | .................. | B60K 26/021 |
| | | | | 74/514 |
| 2004/0145208 A1 * | 7/2004 | Kapteyn | ................. | B62D 25/14 |
| | | | | 296/70 |
| 2004/0227339 A1 * | 11/2004 | Davis | ..................... | B60K 35/22 |
| | | | | 280/771 |
| 2004/0239090 A1 * | 12/2004 | Riefe | ..................... | B62D 1/195 |
| | | | | 280/777 |
| 2005/0029791 A1 * | 2/2005 | Davis | ....................... | G05G 1/36 |
| | | | | 280/752 |
| 2005/0029794 A1 * | 2/2005 | Riefe | ...................... | B60T 7/065 |
| | | | | 280/775 |
| 2005/0050927 A1 * | 3/2005 | Kapteyn | ............... | B60K 35/10 |
| | | | | 70/237 |
| 2005/0200112 A1 * | 9/2005 | Berg | ....................... | B60R 25/25 |
| | | | | 280/775 |
| 2005/0283288 A1 * | 12/2005 | Howell | .................... | B62D 1/18 |
| | | | | 701/41 |
| 2007/0250242 A1 * | 10/2007 | Herges | ................... | B62D 5/001 |
| | | | | 192/99 R |
| 2020/0180525 A1 * | 6/2020 | Yamaguchi | .............. | H02G 3/30 |
| 2020/0254906 A1 * | 8/2020 | Luchner | ................. | B60T 7/042 |
| 2024/0034198 A1 * | 2/2024 | Favaretto | ............ | B60N 2/0742 |
| 2024/0294205 A1 * | 9/2024 | Conigliaro | ............... | B60T 7/06 |

FOREIGN PATENT DOCUMENTS

| | | | | | |
|---|---|---|---|---|---|
| DE | 102005005511 A1 * | 8/2006 | ............ | B60N 2/062 |
| DE | 102016001195 A1 * | 8/2017 | ............ | B62D 25/08 |
| EP | 0141959 B1 * | 4/1988 | | |
| FR | 2765175 A1 * | 12/1998 | ............ | B60K 37/00 |
| IT | TO940299 A1 * | 10/1995 | | |

* cited by examiner

DECOUPLED DRIVER CONTROLS MODULE FOR VEHICLE

FIELD

The present application relates generally to passenger vehicles and, more particularly, to vehicle driver controls systems for steering, throttle, and brake.

BACKGROUND

Vehicles typically include a wall or dash panel to separate the engine compartment from the passenger compartment. Driver controls, such as a steering column assembly and accelerator/brake pedals, are typically physically attached to and/or extend through the wall or dash panel. Many vehicles utilize a hanging (supported from above) brake pedal design that places the pedal mounting structure and the power brake assist device forward of the steering column. The vehicle dash panel typically resides between the pedal support bracket on the cabin side and the power brake booster on the engine side. However, this packaging arrangement requires that the steering column collapse within its reserved space or risk losing initial space for the steering column to stroke. Accordingly, while such conventional systems do work well for their intended purpose, it is desirable to provide continuous improvement in the relevant art.

SUMMARY

In accordance with one example aspect of the invention, a decoupled driver controls module configured to be selectively attached to and repositionable within a vehicle is provided. In one example implementation, the decoupled driver controls module includes a pedal/steering integration structure configured to removably couple to the vehicle, a steer-by-wire steering column coupled to the pedal/steering integration structure, a steering column feedback actuator operably associated with the steering column and configured to provide one or more signals indicative of a steering angle of the steering column, a brake-by-wire brake pedal pivotally coupled to the pedal/steering integration structure, a brake pedal feedback actuator operably associated with the brake pedal and configured to provide one or more signals indicative of a brake pedal pressure, a throttle-by-wire accelerator pedal pivotally coupled to the pedal/steering integration structure, and a throttle position sensor operably associated with the accelerator pedal and configured to provide one or more signals indicative of an accelerator pedal pressure. The decoupled driver controls module is configured as a single unit that can be installed into and selectively removed from the vehicle to facilitate repair/service or repositioning of the decoupled driver controls module within the vehicle.

In addition to the foregoing, the described decoupled driver controls module may include one or more of the following features: a body side attachment structure integrated with the pedal/steering integration structure, wherein the body side attachment structure includes one or more apertures each configured to receive a fastener for coupling the decoupled driver controls module to a dash panel and/or an instrument panel of the vehicle; wherein the pedal/steering integration structure includes a left-side structural frame, a right-side structural frame, an upper support frame, and a rear wall; and wherein the pedal/steering integration structure further includes a steering controls compartment defined by the left-side structural frame, the right-side structural frame, the upper support frame, and the rear wall, and wherein the steering column is received within the steering controls compartment and coupled to the upper support frame and/or the rear wall.

In addition to the foregoing, the described decoupled driver controls module may include one or more of the following features: wherein the pedal/steering integration structure includes a pedal aperture configured to receive a brake pedal arm of the brake pedal therethrough, and wherein the brake pedal feedback actuator is coupled to the pedal/steering integration structure; and a pivot pin coupled to the pedal/steering integration structure, wherein the accelerator pedal is configured to pivot about the pivot pin, and wherein the throttle position sensor is coupled to the pedal/steering integration structure.

In addition to the foregoing, the described decoupled driver controls module may include one or more of the following features: an electrical connector configured to couple to an electronic control unit of the vehicle, a first wire coupled between the electrical connector and the steering column feedback actuator, a second wire coupled between the electrical connector and the brake pedal feedback actuator, and a third wire coupled between the electrical connector and the throttle position sensor; wherein there are no mechanical connections between the vehicle and each of the steering column, the brake pedal, and the accelerator pedal; and wherein the decoupled driver controls module is configured to interchangeably couple between both a left-hand side of the vehicle and a right-hand side of the vehicle.

In accordance with another example aspect of the invention, a vehicle is provided. In one example implementation, the vehicle includes a vehicle cabin having a dash panel, and a decoupled driver controls module configured to be selectively coupled to and removed from the dash panel. The decoupled driver controls module includes a pedal/steering integration structure configured to removably couple to the dash panel, a steer-by-wire steering column coupled to the pedal/steering integration structure, a steering column feedback actuator operably associated with the steering column and configured to provide one or more signals indicative of a steering angle of the steering column, a brake-by-wire brake pedal pivotally coupled to the pedal/steering integration structure, a brake pedal feedback actuator operably associated with the brake pedal and configured to provide one or more signals indicative of a brake pedal pressure, a throttle-by-wire accelerator pedal pivotally coupled to the pedal/steering integration structure, and a throttle position sensor operably associated with the accelerator pedal and configured to provide one or more signals indicative of an accelerator pedal pressure. The decoupled driver controls module is configured as a single unit that can be installed into and selectively removed from the vehicle to facilitate repair/service or repositioning of the decoupled driver controls module within the vehicle.

In addition to the foregoing, the described vehicle may include one or more of the following features: wherein the decoupled driver controls module further includes a body side attachment structure integrated with the pedal/steering integration structure, and wherein the body side attachment structure includes one or more apertures each receiving a fastener for coupling the decoupled driver controls module to the dash panel; wherein the pedal/steering integration structure includes a left-side structural frame, a right-side structural frame, an upper support frame, and a rear wall; and wherein the pedal/steering integration structure further includes a steering controls compartment defined by the left-side structural frame, the right-side structural frame, the upper support frame, and the rear wall, and wherein the steering column is received within the steering controls compartment and coupled to the upper support frame and/or the rear wall.

In addition to the foregoing, the described vehicle may include one or more of the following features: wherein the pedal/steering integration structure includes a pedal aperture configured to receive a brake pedal arm of the brake pedal therethrough, and wherein the brake pedal feedback actuator is coupled to the pedal/steering integration structure; wherein the decoupled driver controls module further includes a pivot pin coupled to the pedal/steering integration structure, wherein the accelerator pedal is configured to pivot about the pivot pin, and wherein the throttle position sensor is coupled to the pedal/steering integration structure.

In addition to the foregoing, the described vehicle may include one or more of the following features: an electronic control unit in signal communication with the steering column feedback actuator, the brake pedal feedback actuator, and the throttle position sensor, wherein the electronic control unit is configured to control steering, throttle, and braking of the vehicle based on signals from the steering column feedback actuator, the brake pedal feedback actuator, and the throttle position sensor; and wherein the decoupled driver controls module further includes an electrical connector configured to couple to the electronic control unit, a first wire coupled between the electrical connector and the steering column feedback actuator, a second wire coupled between the electrical connector and the brake pedal feedback actuator, and a third wire coupled between the electrical connector and the throttle position sensor.

In addition to the foregoing, the described vehicle may include one or more of the following features: wherein there are no mechanical connections between the vehicle and each of the steering column, the brake pedal, and the accelerator pedal; wherein the decoupled driver controls module is configured to interchangeably couple between both a left-hand side of the vehicle and a right-hand side of the vehicle; and wherein the decoupled driver controls module is isolated from a load path of a body/chassis structure deformation of the vehicle in the event of a frontal impact event.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

Figure 1:
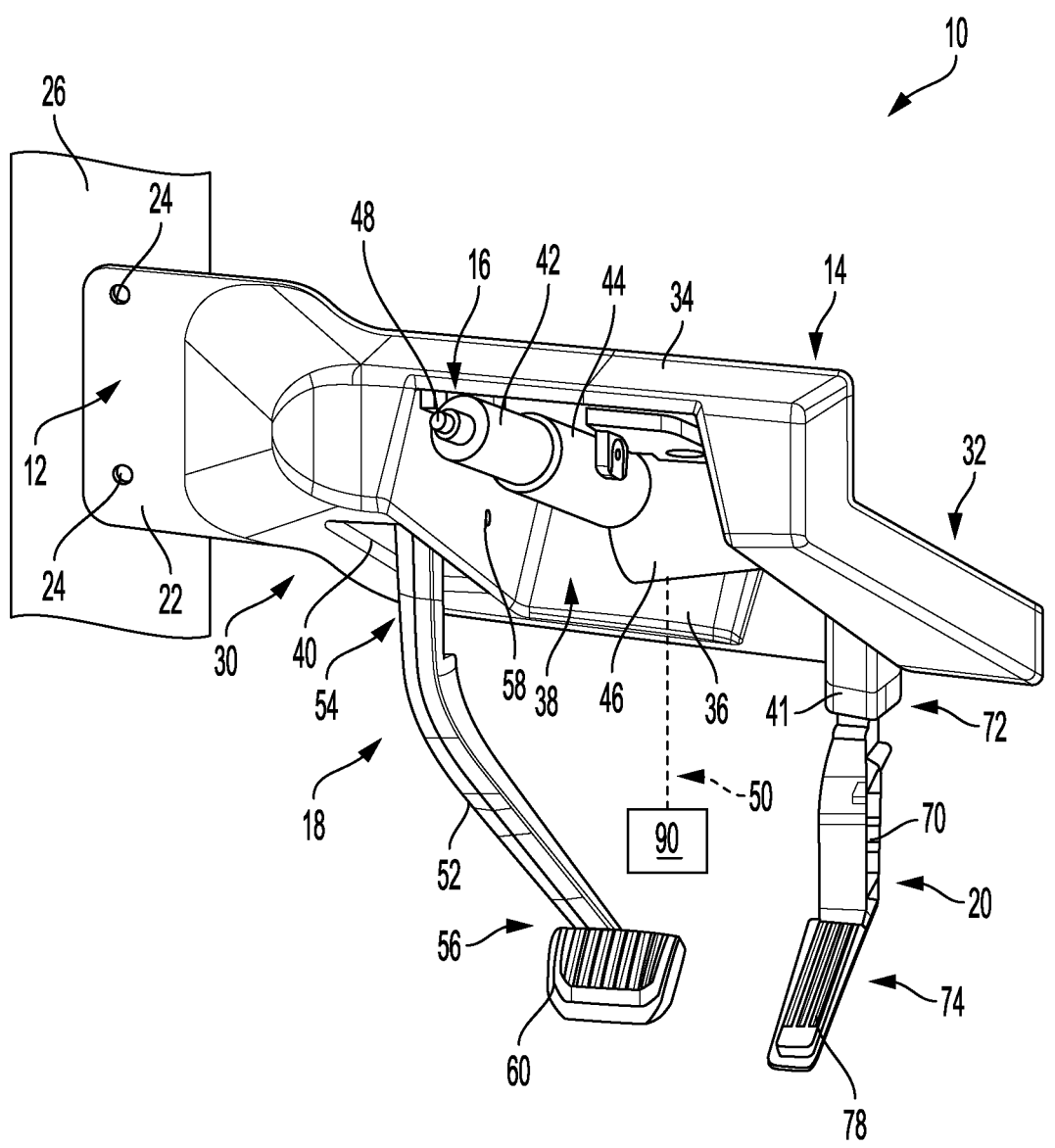
FIG. 1 is a front perspective view of an example decoupled driver controls module for a passenger vehicle in accordance with the principles of the present application.

As previously described, vehicles typically include a wall or dash panel to separate the engine compartment from the passenger compartment. Driver controls, such as a steering column assembly and accelerator/brake pedals, physically attach to and/or extend through the wall or dash panel. For example, steering columns and brake pedals may be mounted in a common bracket that attaches to the dash panel and instrument panel structure, or they may be separated by mounting the column to the instrument panel and the pedal bracket to the dash panel.

Generally, steering columns are designed to collapse within their own static package footprint, and steering intermediate shafts are designed to allow combinations of collapsing and bending. Brake pedal brackets and power assist devices are designed to buckle or collapse under specific frontal crash conditions to prevent pushing the steering column and/or pedals rearward towards the driver. However, such conventional mechanically linked and power assisted driver controls require significant component packaging effort to adapt to the driver position in vehicle, the vehicle structure, the space to package the hydraulic side of the brake system, and the routing of an intermediate shaft form the steering wheel to the steering gear or rack. The integration of these features often conflicts with vehicle styling and driveline configurations.

In this way, conventional driver controls include fully mechanical steering and braking inputs from the driver with different downstream treatments for power assistance to then control the vehicle's motion. These designs have evolved to include features that add cost and weight to the components to meet occupant protection test requirements. Such added cost and weight are carried throughout the useful life of the vehicle and are only useful in a crash event that would likely result in an unsalvageable repair cost.

Accordingly, described herein are systems and methods for a decoupled driver controls module that redesigns and repackages the driver controls to reduce or eliminate interactions during impact events. In one example, the system repackages the steering column and pedal box content into an integrated steering column/pedal module. By-wire technology replaces the steering column intermediate shaft and the by-wire brakes replace a traditional mechanical actuator rod (which protrudes forward from the occupant cabin to an assist/boost system) with a pedal feedback actuator that is packaged to provide clearance from the traditional dash panel and the deformation of the panel that can happen in a frontal impact event.

In one example, the decoupled driver controls module is a combination of vehicle control interfaces packaged for driver ergonomics, but isolated from the typical mechanical connections that add additional content and resulting mass to the vehicle. The system is configured to isolate the driver control interfaces (e.g., steering column, accelerator/brake pedals) from the portions of the vehicle that are designed to deform under crash test conditions. This isolation enables the controls and their mounting structure to be optimized for their primary functions and not burdened with additional collapsing mechanisms, dampers, and connections that add mass and increase assembly process steps.

The decoupled driver controls system also enables the creation of a vehicle architecture that is more easily adapted as a driverless vehicle with autonomous driving technology or as a fully driver-controlled vehicle with little or no autonomous technology. This flexibility also enables a vehicle to be converted/updated, for example, between a driver/driverless configuration or between left-hand driver and right-hand drive configurations.

In the example embodiment, the decoupled driver controls module utilizes by-wire driver components that enable control/operation through electrical wires/signals rather than through mechanical connections. In one implementation, the driver controls module includes steering column functionality and pedal functionality. The steering column functionality includes ergonomic adjustment for driver, tilt, or telescope, energy management for frontal impact performance, and steer by wire feedback actuation. The pedal functionality includes ergonomic static placement of common pedal positions (or adjustable pedal feature), and force feedback tunability for each pedal used to provide vehicle feedback to the driver.

In the example embodiment, the steering column includes a steering column shaft, a steering column jacket, ergonomic adjustment mechanisms, a steering column to instrument panel interface, and a tunable energy management device for column stroke. The pedals include a pedal pad to driver foot interface, a pedal pivot, a pedal arm (connecting pad to pivot), pedal feedback actuator(s) (connecting to pedal lever), and optional adjustable pedal mechanisms.

A pedal/steering integration structure provides several features. First, it provides structural support between the pedal pivot and the pedal feedback actuator. Second, it provides an interface for attachments to the vehicle body structure. Primary strength and stiffness may be obtained from an outboard inner body side structure. Additional bracing can be added as styling, strength/stiffness, and vehicle structure geometry require. Third, it provides an optional column design, which provides structural support between the tilt adjustment mechanism and the adjustment pivot support point of the steering jacket.

The decoupled driver controls module may be associated with additional/adjacent components such as, for example, a steering control user interface (wheel or yoke), a driver airbag module, a steering column control module, body structure mounting surfaces, by-wire sensors/wiring/modules, a knee blocker, and/or knee bag interfaces.

In general, the decoupled driver controls module utilizes "by-wire" enabled driving control sensors and feedback actuators attached to a driver control structure that is better isolated from crash test structural deformation. The use of by-wire vehicle controls and integration of the control features into a single module reduces the quantity of mechanical interfaces in the vehicle to only a few interior mechanical attachments and electrical interfaces. Due to the module's decoupled nature, it is not necessary to transfer axial movement (e.g., a pedal actuator) or rotational movement (e.g., an intermediate shaft) to the exterior/engine compartment like conventional systems.

Moreover, the by-wire steering and pedal controls are designed and positioned in a manner that isolates them from the typical load path or stack-up of body/chassis structure deformation in the event of a frontal impact event/test. This isolation allows the steering and pedal controls to be optimized for driver control, ergonomic, and cabin restraint system design criteria.

Accordingly, the system described herein provides a compact and lightweight driver controls package that integrates structurally significant driver control content to enable easy conversion between driverless autonomous use or left/right-hand driver station configurations. The system integrates by-wire control components into a single module and efficiently utilizes the typical packaging space available in front of the driver. In this way, the system provides the following advantages: (i) a smaller/lighter packaging size for structurally reactive driver controls, combining high force steering and braking input reactions into one structural component, (ii) the ability to optimize the controls to the occupant without compromises for routing mechanical redundancy features, (iii) the ability to design the occupant cabin and front cargo space as a common area without a dash panel as a separator, (iv) the ability to design a dash panel separator without structural requirements in support of the steering column, intermediate shaft, and pedal controls, (v) a module that can be assembled and tested as an integrated driver control unit, integrating functions through one electronic control unit to connect to the vehicle, (vi) a module that can convert a vehicle between fully autonomous (e.g., L5 no driver controls) and lower levels of autonomy that require situational or permanent manual driving controls, (vii) a module that can be used to change a vehicle from left-hand drive orientation to right-hand drive orientation at the factory or during its service life, (viii) a module that can be reused in multiple vehicle applications without extensive module redesign, (ix) a module that can be adapted into multiple vehicles without extensive vehicle redesign, and (x) a module that can be easily serviced/replaced.

Figure 2:
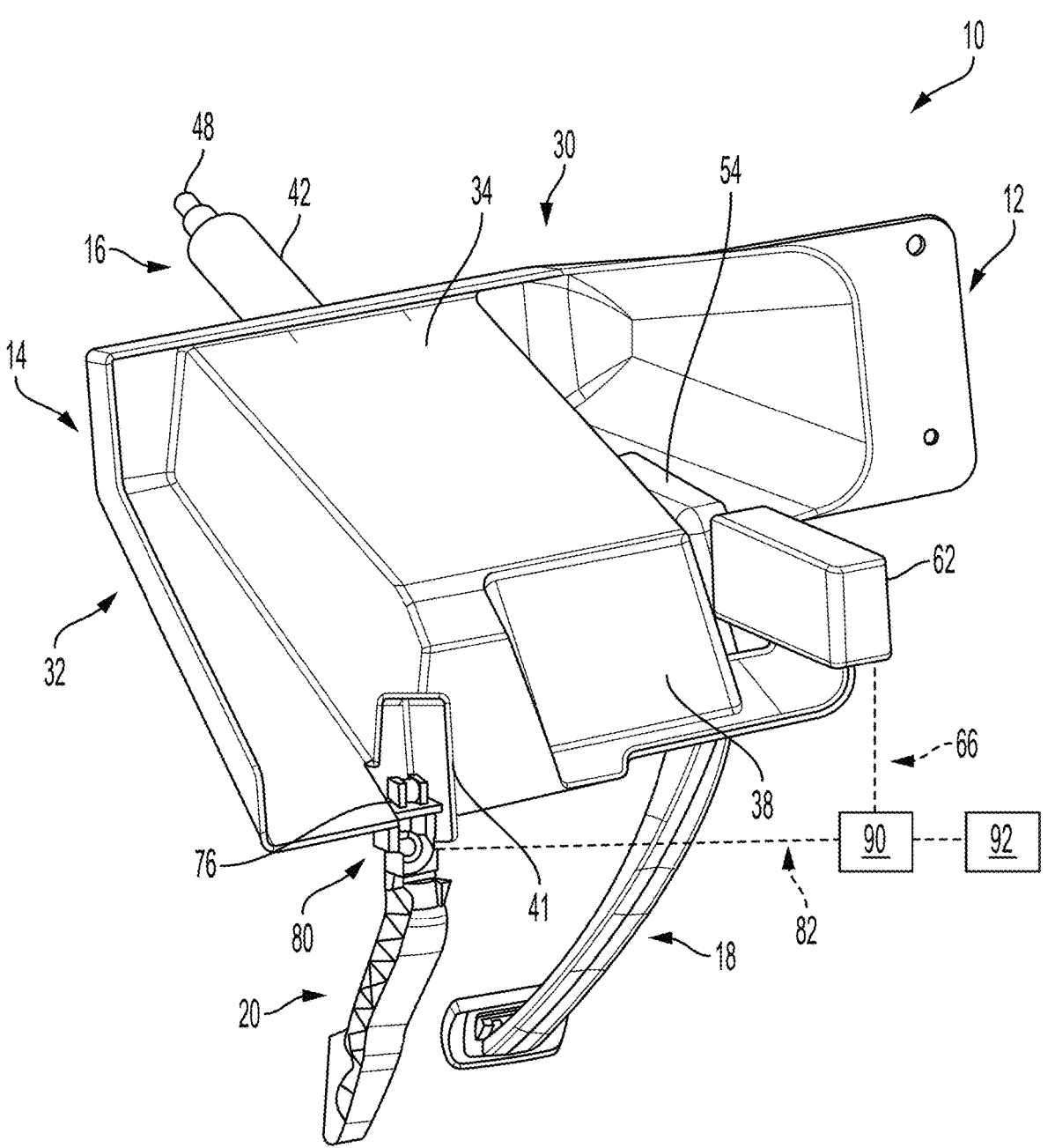
FIG. 2 is a rear perspective view of the decoupled driver controls module shown in FIG. 1, in accordance with the principles of the present application.

Referring now to FIGS. 1 and 2, an example decoupled driver controls module for a passenger vehicle is generally shown and indicated at reference numeral 10. The decoupled driver controls module 10 is a standalone, modular unit configured to be easily installed into and removed from a vehicle (not shown). This enables the vehicle to be designed such that the decoupled driver controls module 10 can be easily installed on either left- or right-hand sides of the vehicle, switched out (e.g., for repairs/service), or upgraded. The decoupled driver controls module 10 advantageously provides drive-by-wire function for steering, throttle, and braking, thus obviating the need for additional mechanical connections to the vehicle body.

In the example embodiment, the decoupled driver controls module 10 generally includes a body side attachment structure 12, a pedal/steering integration structure 14, a steering column 16, a brake pedal 18, and an accelerator pedal 20. In the example implementation, the body side attachment structure 12 includes an attachment flange 22 having one or more apertures 24 to receive a fastener (not shown) for attaching the body side attachment structure 12 to a portion of the vehicle such as, for example, a dash panel, instrument panel, etc., shown at 26 in FIG. 1.

The pedal/steering integration structure 14 includes a left-side structural frame 30, a right-side structural frame 32, an upper support frame 34, and a rear wall 36. A steering controls compartment 38 is configured to receive the steering column 16 and is defined by the surrounding left-side structural frame 30, right-side structural frame 32, upper support frame 34, and rear wall 36. The left-side structural frame 30 includes pedal aperture or port 40 configured to receive the brake pedal 18 therethrough. The right-side structural frame 32 includes a chimney-like receiving channel 41 configured to receive the accelerator pedal 20 therein.

As shown in FIG. 1, the steering column 16 is coupled to the pedal/steering integration structure 14, for example, at the upper support frame 34 and/or the rear wall 36. The steering column 16 generally includes an inner jacket 42, an outer jacket 44, a steering column feedback actuator 46, and a steering shaft 48. The inner jacket 42 is configured to slide axially within the outer jacket 44 to enable telescopic adjustment and/or restraint system collapse. Moreover, the inner jacket 42 may telescope into and out of the outer jacket 44 to move the steering wheel between a deployed position (telescoped toward the driver) and a stowed position (telescoped away from the driver), for example, during autonomous driving. The inner and outer jackets 42, 44 receive the steering shaft 48 and include bearings (not shown) to allow rotation of the steering shaft 48 therein. A distal end of the steering shaft 48 is configured to couple to a steering device, such as a steering wheel or steering handles (not shown).

The steering column feedback actuator 46 includes one or more sensors (not shown) configured to sense rotation of the steering shaft 48 and provide feedback signals thereof via a wire 50 connected to an electrical connector 90 (e.g., a wiring harness). The electrical connector 90 is configured to electrically couple to a controller 92, such as an electronic control unit (ECU) of the vehicle. The controller 92 is configured to receive signals from the steering column feedback actuator 46 indicating a steering angle of the steering column 16, and provide subsequent steering control of the vehicle wheels based on those signals.

Figure 3:
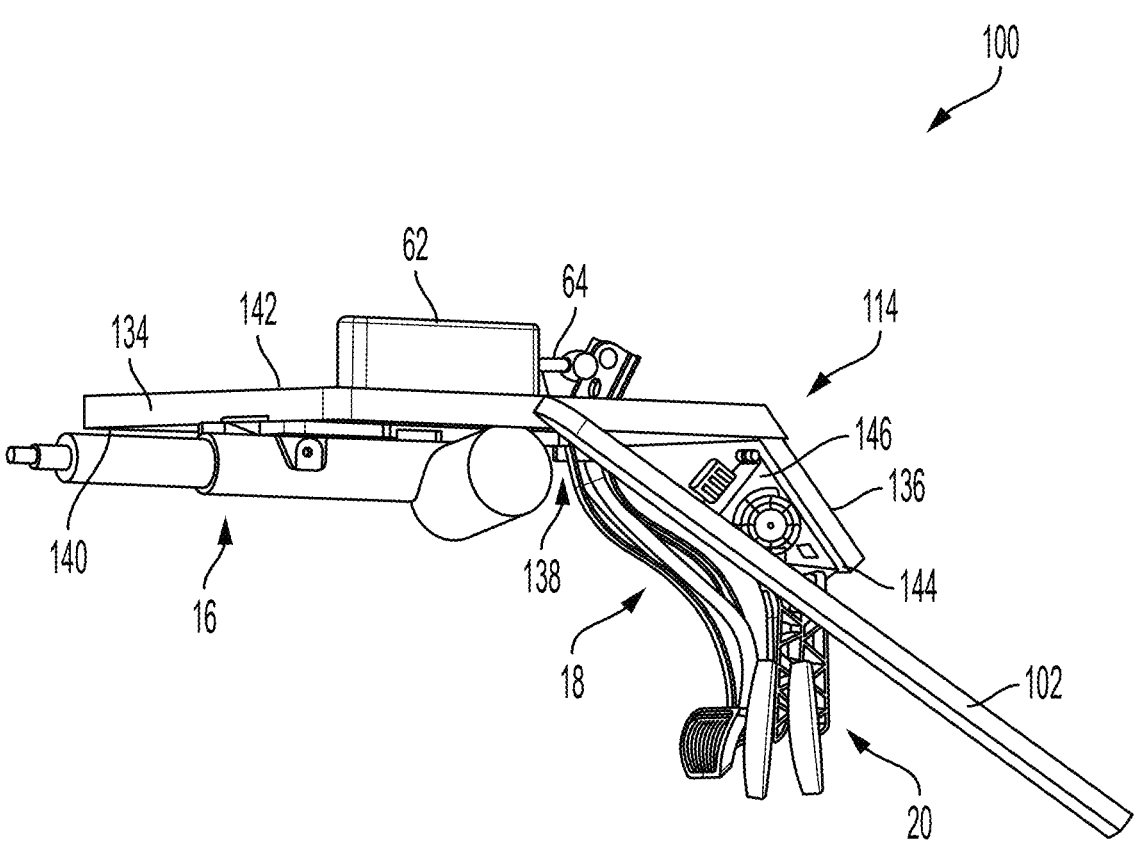
FIG. 3 is a side perspective view of another example decoupled driver controls module, in accordance with the principles of the present application.

In the example embodiment, the brake pedal 18 generally includes a brake pedal arm 52 having a proximal end 54 and an opposite distal end 56. The proximal end 54 is configured to rotatably coupled to a pivot pin 58 (FIG. 1) such that the brake pedal arm 52 is rotatable about an axis thereof. The distal end 56 includes a foot pad 60 configured to receive a foot of the driver for actuation of the vehicle brakes. The proximal end 54 is operably associated with a brake pedal feedback actuator 62 (FIG. 2), for example, via a plunger or shaft 64 (FIG. 3). The brake pedal feedback actuator 62 includes one or more sensors (not shown) configured to sense actuation (e.g., pressure) of the brake pedal 18 and provide feedback signals thereof via a wire 66 connected to the electrical connector 90. The controller 92 is configured to receive signals from the brake pedal feedback actuator 62 indicating a degree of actuation of the brake pedal 18, and provide subsequent by-wire braking control of the vehicle braking system based on those signals.

In the example embodiment, the accelerator pedal 20 generally includes an accelerator pedal arm 70 having a proximal end 72 and an opposite distal end 74. The proximal end 72 is configured to rotatably couple to a pivot pin 76 (FIG. 2) such that the accelerator pedal arm 70 is rotatable about an axis thereof. The distal end 74 includes a foot pad 78 configured to receive a foot of the driver for actuation of the vehicle throttle. The proximal end 72 is operably associated with a throttle position sensor 80 (FIG. 2). The throttle position sensor 80 is configured to sense actuation (e.g., pressure) of the accelerator pedal 20 and provide feedback signals thereof via a wire 82 connected to the electrical connector 90. The controller 92 is configured to receive signals from the throttle position sensor 80 indicating a degree of actuation of the accelerator pedal 20, and provide subsequent by-wire throttle control of the vehicle propulsion system (e.g., electric traction motor and/or engine) based on those signals.

FIG. 3 illustrates an alternative embodiment of the decoupled driver controls module generally shown and indicated at reference numeral 100. The decoupled driver controls module 100 is similar to the module 10 and like reference numerals indicate like parts. FIG. 3 illustrates a pedal/steering integration structure 114 with only an upper support frame 134 and a rear wall 136, with the integration structure 114 additionally configured to couple to the vehicle (e.g., dash panel, instrument panel, etc.) via a support member 102. However, it will be appreciated that pedal/steering integration structure 114 may have additional structure similar to pedal/steering integration structure 14, as well as body side attachment structure 12.

In the example embodiment, the steering column 16 is coupled to the pedal/steering integration structure 114, for example, at a lower/inner surface 140 of the upper support frame 134. The upper support frame 134 includes pedal aperture or port 138 configured to receive the brake pedal 18 therethrough. The brake pedal feedback actuator 62 is coupled to an upper/outer surface 142 of the upper support frame 134 and is operably coupled to the brake pedal 18 via plunger/shaft 64. The accelerator pedal 20 is coupled to an inner surface 144 of the rear wall 136 via a pivot support 146, which includes throttle position sensor 80. As in the previous embodiment, the steering column feedback actuator 46, brake pedal feedback actuator 62, and throttle position sensor 80 are in signal communication with the controller 92 via electrical connector 90 or wirelessly.

Described herein are systems and methods for a decoupled driver controls module that is modularly designed to be installed in various locations within various types of vehicles. This enables a single driver controls module packaging to be used across many platforms without change to the module design. The decoupled driver controls module advantageously combines steering control, throttle control, and brake control into a single unit that does not require vehicle-specific coupling or integration into impact-event structural components of the vehicle. Moreover, the steering control, throttle control, and brake control are all by-wire, obviating the need for mechanical steering, throttle, and brake connections typically utilized in conventional vehicles.

It will be appreciated that the term "controller" or "module" or "computing server/device" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A decoupled driver controls module configured to be selectively attached to and repositionable within a vehicle, the decoupled driver controls module comprising:

a body side attachment structure, including one or more apertures each configured to receive a fastener for coupling the decoupled driver controls module into a fixed position on a dash panel of the vehicle;

a pedal/steering integration structure integrated with the body side attachment structure and including:

a left-side structural frame wall and a right-side structural frame wall extending rearward toward a rear of the vehicle;

an upper support frame wall extending between the left-side and right-side structural frame walls;

a rear wall connected to the upper support frame wall; and a steering controls compartment defined by the left-side structural frame wall, the right-side structural frame wall, the upper support frame wall, and the rear wall;

a steer-by-wire steering column received within the steering controls compartment and coupled to the upper support frame wall and/or the rear wall;

a steering column feedback actuator operably associated with the steering column and configured to provide one or more signals indicative of a steering angle of the steering column;

a brake-by-wire brake pedal pivotally coupled to the pedal/steering integration structure;

a brake pedal feedback actuator operably associated with the brake pedal and configured to provide one or more signals indicative of a brake pedal pressure;

a throttle-by-wire accelerator pedal pivotally coupled to the pedal/steering integration structure; and a throttle position sensor operably associated with the accelerator pedal and configured to provide one or more signals indicative of an accelerator pedal pressure, wherein the decoupled driver controls module is configured as a single unit that can be installed into and selectively removed from the vehicle to facilitate repair/service or repositioning of the decoupled driver controls module within the vehicle.

2. The decoupled driver controls module of claim 1, wherein the brake pedal feedback actuator is disposed on a rear side of the pedal/steering integration structure so as to conceal the brake pedal feedback actuator.

3. The decoupled driver controls module of claim 1, wherein the steer-by-wire steering column comprises:

an outer jacket; and an inner jacket slidingly disposed within the outer jacket for telescopic adjustment to move a steering wheel between a deployed position for driver actuation, and a stowed position for autonomous driving.

4. The decoupled driver controls module of claim 1, wherein the pedal/steering integration structure includes a pedal aperture configured to receive a brake pedal arm of the brake pedal therethrough, and wherein the brake pedal feedback actuator is coupled to the pedal/steering integration structure.

5. The decoupled driver controls module of claim 1, further comprising a pivot pin coupled to the pedal/steering integration structure, wherein the accelerator pedal is configured to pivot about the pivot pin, and wherein the throttle position sensor is coupled to the pedal/steering integration structure.

6. The decoupled driver controls module of claim 1, further comprising:

an electrical connector configured to couple to an electronic control unit of the vehicle;

a first wire coupled between the electrical connector and the steering column feedback actuator;

a second wire coupled between the electrical connector and the brake pedal feedback actuator; and a third wire coupled between the electrical connector and the throttle position sensor.

7. The decoupled driver controls module of claim 1, wherein there are no mechanical connections between the vehicle and each of the steering column, the brake pedal, and the accelerator pedal.

8. The decoupled driver controls module of claim 1, wherein the decoupled driver controls module is configured to interchangeably couple between both a left-hand side of the vehicle and a right-hand side of the vehicle.

9. A vehicle comprising:

a dash panel; and a decoupled driver controls module configured to be selectively coupled to and removed from the dash panel, the decoupled driver controls module comprising:

a body side attachment structure, including one or more apertures each configured to receive a fastener for coupling the decoupled driver controls module into a fixed position on the dash panel;

a pedal/steering integration structure integrated with the body side attachment structure and including:

a left-side structural frame wall and a right-side structural frame wall extending rearward toward a rear of the vehicle;

an upper support frame wall extending between the left-side and right-side structural frame walls;

a rear wall connected to the upper support frame wall; and a steering controls compartment defined by the left-side structural frame wall, the right-side structural frame wall, the upper support frame wall, and the rear wall;

a steer-by-wire steering column received within the steering controls compartment and coupled to the upper support frame wall and/or the rear wall;

a steering column feedback actuator operably associated with the steering column and configured to provide one or more signals indicative of a steering angle of the steering column;

a brake-by-wire brake pedal pivotally coupled to the pedal/steering integration structure;

a brake pedal feedback actuator operably associated with the brake pedal and configured to provide one or more signals indicative of a brake pedal pressure;

a throttle-by-wire accelerator pedal pivotally coupled to the pedal/steering integration structure; and a throttle position sensor operably associated with the accelerator pedal and configured to provide one or more signals indicative of an accelerator pedal pressure, wherein the decoupled driver controls module is configured as a single unit that can be installed into and selectively removed from the vehicle to facilitate repair/service or repositioning of the decoupled driver controls module within the vehicle.

10. The vehicle of claim 9, wherein the brake pedal feedback actuator is disposed on a rear side of the pedal/steering integration structure so as to conceal the brake pedal feedback actuator.

11. The vehicle of claim 9, wherein the steer-by-wire steering column comprises:

an outer jacket; and an inner jacket slidingly disposed within the outer jacket for telescopic adjustment to move a steering wheel between a deployed position for driver actuation, and a stowed position for autonomous driving.

12. The vehicle of claim 9, wherein the pedal/steering integration structure includes a pedal aperture configured to receive a brake pedal arm of the brake pedal therethrough, and wherein the brake pedal feedback actuator is coupled to the pedal/steering integration structure.

13. The vehicle of claim 9, wherein the decoupled driver controls module further includes:

a pivot pin coupled to the pedal/steering integration structure, wherein the accelerator pedal is configured to pivot about the pivot pin, and wherein the throttle position sensor is coupled to the pedal/steering integration structure.

14. The vehicle of claim 9, further comprising an electronic control unit in signal communication with the steering column feedback actuator, the brake pedal feedback actuator, and the throttle position sensor, wherein the electronic control unit is configured to control steering, throttle, and braking of the vehicle based on signals from the steering column feedback actuator, the brake pedal feedback actuator, and the throttle position sensor.

15. The vehicle of claim 14, wherein the decoupled driver controls module further includes:

an electrical connector configured to couple to the electronic control unit;

a first wire coupled between the electrical connector and the steering column feedback actuator;

a second wire coupled between the electrical connector and the brake pedal feedback actuator; and a third wire coupled between the electrical connector and the throttle position sensor.

16. The vehicle of claim 9, wherein there are no mechanical connections between the vehicle and each of the steering column, the brake pedal, and the accelerator pedal.

17. The vehicle of claim 9, wherein the decoupled driver controls module is configured to interchangeably couple between both a left-hand side of the vehicle and a right-hand side of the vehicle.

* * * * *